(12) United States Patent
Ved et al.

(10) Patent No.: US 11,731,464 B2
(45) Date of Patent: Aug. 22, 2023

(54) TYRE TREAD

(71) Applicant: Apollo Tyres Global R&D B. V., Enschede (NL)

(72) Inventors: Mihar Ved, Enschede (NL); Sanjay Patel, Enschede (NL); Jelin Fatima, Enschede (NL); Marko Veselinovic, Enschede (NL)

(73) Assignee: Apollo Tyres Global R&D B.V., Enschede (NL)

( * ) Notice: Subject to any disclaimer, the term of this patent is extended or adjusted under 35 U.S.C. 154(b) by 416 days.

(21) Appl. No.: 16/722,522

(22) Filed: Dec. 20, 2019

(65) Prior Publication Data

US 2021/0170802 A1 Jun. 10, 2021

(30) Foreign Application Priority Data

Dec. 10, 2019 (DE) ..................... 20 2019 106 882.5

(51) Int. Cl.
  *B60C 11/12* (2006.01)
  *B60C 11/13* (2006.01)
  (Continued)

(52) U.S. Cl.
  CPC .............. *B60C 11/13* (2013.01); *B60C 11/01* (2013.01); *B60C 11/11* (2013.01);
  (Continued)

(58) Field of Classification Search
  CPC ..... B60C 11/01; B60C 11/11; B60C 11/1218; B60C 2011/013; B60C 2011/0346;
  (Continued)

(56) References Cited

U.S. PATENT DOCUMENTS 5,957,180 A * 9/1999 Kuramochi ............. B60C 11/13
  152/902
6,920,906 B2   7/2005 Allison et al.
  (Continued)

FOREIGN PATENT DOCUMENTS

DE       4019386 A1   1/1991
DE   102008007548 A1   8/2009
  (Continued)

OTHER PUBLICATIONS

Machine translation for Japan 2017-087987 (Year: 2022).*
  (Continued)

*Primary Examiner* — Steven D Maki
(74) *Attorney, Agent, or Firm* — Renner, Otto, Boisselle & Sklar, LLP

(57) ABSTRACT

It is provided a pneumatic tyre, the tyre having a circumferential direction, an axial direction and an equatorial plane, and the tyre comprising: a tread extending in a tyre circumferential direction, said tread comprising at least one circumferential groove running continuously in the circumferential direction, and a plurality of axial grooves or transverse grooves running at an angle to the axial direction, and a plurality of blocks defined by the circumferential groove and the axial grooves or transverse grooves, said blocks extending radially between an inner surface of the tread and a tread surface to come into contact with the ground, wherein at least some of the blocks comprise at least one wavy groove that extends from a circumferential groove inwardly into the block, and wherein the wavy groove has a depth extending radially from the tread surface to come into contact with the ground towards the inner surface that ends above the inner surface (26) of the tread.

13 Claims, 3 Drawing Sheets

Figure 1:
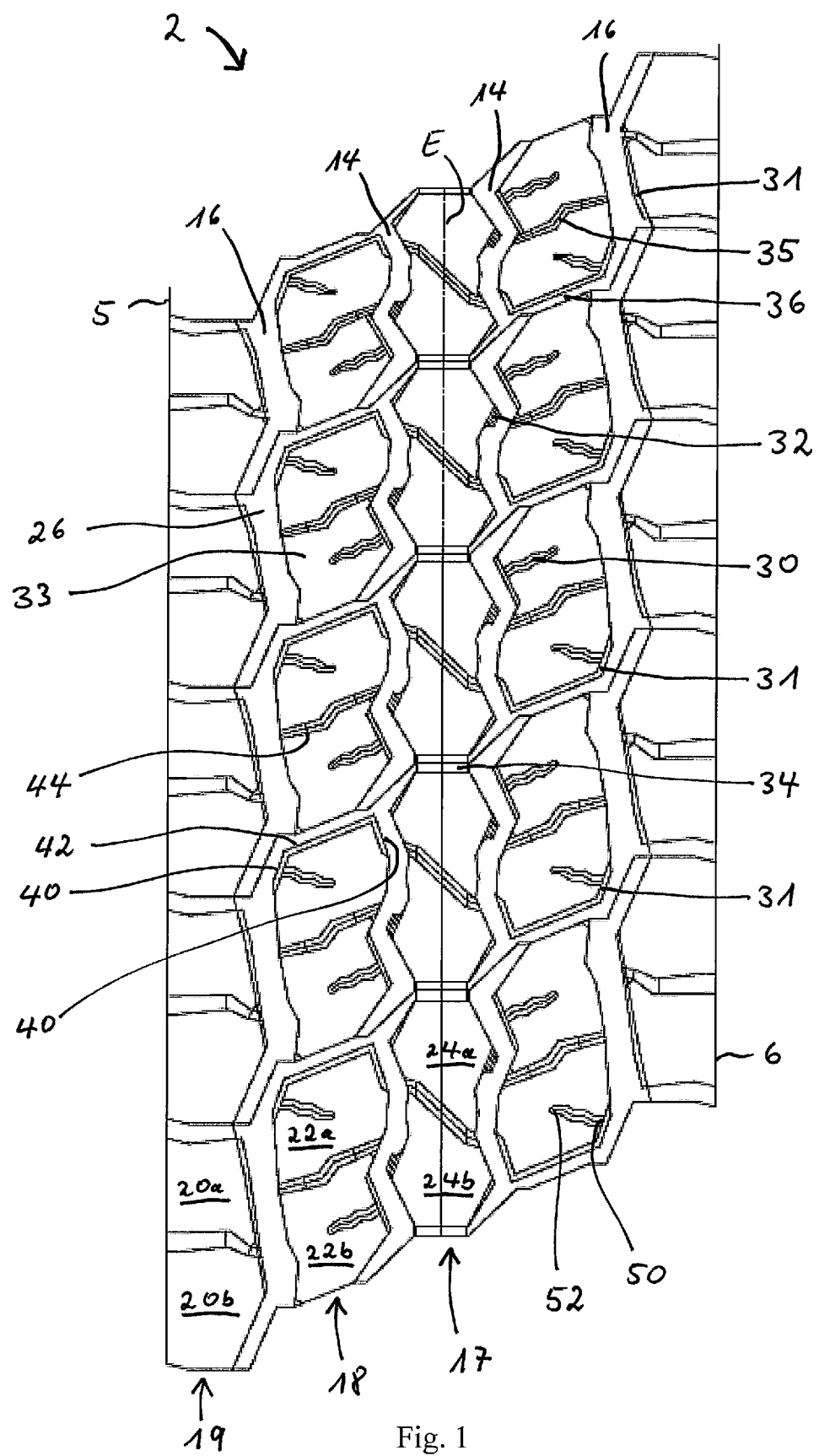

(51) Int. Cl.
  *B60C 11/11* (2006.01)
  *B60C 11/01* (2006.01)
  *B60C 11/03* (2006.01)

(52) U.S. Cl.
  CPC ...... *B60C 11/1204* (2013.01); *B60C 11/1218* (2013.01); *B60C 11/1236* (2013.01); *B60C 2011/013* (2013.01); *B60C 2011/0346* (2013.01); *B60C 2011/0358* (2013.01); *B60C 2011/0362* (2013.01); *B60C 2011/0369* (2013.01); *B60C 2011/1213* (2013.01); *B60C 2011/1295* (2013.01); *B60C 2011/1338* (2013.01); *B60C 2200/14* (2013.01)

(58) Field of Classification Search
  CPC ..... B60C 2011/0362; B60C 2011/0369; B60C 2011/1213; B60C 2011/1295; B60C 2011/1338
  See application file for complete search history.

(56) References Cited

U.S. PATENT DOCUMENTS

| | | | |
|---|---|---|---|
| 8,181,682 B2 | 5/2012 | Miyazaki | |
| 8,365,783 B2 | 2/2013 | Minoli et al. | |
| 9,969,224 B2 | 5/2018 | Pokutta-Paskaleva et al. | |
| 2001/0032691 A1* | 10/2001 | Ohsawa | B60C 11/13 152/209.18 |
| 2008/0141385 A1 | 6/2008 | Blackwell et al. | |
| 2013/0025755 A1* | 1/2013 | Nomura | B60C 13/02 152/209.16 |
| 2016/0114629 A1* | 4/2016 | Hashimoto | B60C 11/12 152/209.1 |
| 2017/0015142 A1 | 1/2017 | Kaneko | |
| 2017/0120685 A1 | 5/2017 | Hayashi | |
| 2017/0120691 A1 | 5/2017 | Arai | |
| 2017/0174007 A1 | 6/2017 | Kuwano | |
| 2018/0264893 A1 | 9/2018 | Nishiwaki | |
| 2021/0138842 A1* | 5/2021 | Horiuchi | B60C 11/125 |
| 2021/0155054 A1* | 5/2021 | Yukami | B60C 11/1353 |

FOREIGN PATENT DOCUMENTS

| | | | |
|---|---|---|---|
| DE | 102013100186 A1 | | 7/2013 |
| EP | 393873 A2 | * | 10/1990 |
| JP | 01-132406 A | * | 5/1989 |
| JP | 20143433 A | | 2/2014 |
| JP | 2016022807 A | | 2/2016 |
| JP | 2017-087987 A | * | 5/2017 |
| KR | 20090051512 A | | 5/2009 |
| WO | WO-99/48707 A1 | * | 9/1999 |

OTHER PUBLICATIONS

Machine translation for Japan 01-132406 (Year: 2022).*
German Search Report corresponding with Application No. 20 2019 106 882.5 dated Aug. 4, 2020.

* cited by examiner

TYRE TREAD

This application claims priority to German utility model No. 20 2019 106 882 filed Dec. 10, 2019.

The invention relates to a tyre tread. The tyre tread is usable for a wide variety of vehicle tyres such as on road, off road and mud terrain tyres, and in particular for so-called all-terrain tyres.

All-terrain tyres are intended for off road use and are designed to provide good traction on multiple terrain types. All-terrain tyres are designed for driving on an underground of dirt, gravel stone, sand, mud or snow, and the tyre needs to provide sufficient traction on these undergrounds to keep an automobile moving forward. The treads of such tyres generally are provided with a plurality of blocks separated one from the other by grooves of generally transverse and circumferential grooves. The circumferential grooves on the other hand generate air column resonance noise when running on dry road. All-terrain tyre treads are provided with structural features for improvement of traction on different grounds, reduction of noise, as well as improvement of wet and dry performance.

US 2008/0141385 A1 describes a tyre including a tread portion being provided with a crown main groove extending continuously in a zigzag manner in a tyre circumferential direction and a shoulder main groove extending continuously in a zigzag manner in the tyre circumferential direction. The shoulder main groove is arranged outwardly of the crown main groove in a tyre axial direction. The crown main groove has a number of zigzag pitches in a range of from 0.21 to 0.32 times a number of zigzag pitches of the shoulder main groove. The modification of mainly the shoulder main grooves provides tyres capable of improving noise performance while maintaining wet performance.

US 2017/0015142 A1 describes a tyre tread that has a ground contact surface for contacting a road surface while the tyre is running, wherein the tread comprises at least one circumferential main groove extending in the tyre circumferential direction, a plurality of auxiliary grooves extending in the tyre rotation axis direction, and a plurality of blocks defined by the circumferential main groove and the auxiliary grooves, where the blocks comprise a reinforcing part and a waveform part provided on at least one front surface side wall.

US 2018/0264893 A1 describes a tyre comprising a tread portion comprising a plurality of blocks. US 2017/0120691 A1 describes a pneumatic tyre includes a tread portion provided with at least one block and a groove adjacent the at least one block.

U.S. Pat. No. 8,365,783 B2 describes a tyre including a tread band having a tread pattern defined by a plurality of grooves of substantially circumferential orientation and by a plurality of grooves of substantially transverse orientation, which grooves delimit a plurality of rubber blocks arranged in a plurality of rows of substantially circumferential orientation, each of the blocks being delimited by a contact face and at least three side faces, wherein at least some of the blocks include at least one side face of substantially transverse orientation provided with at least one irregularly shaped step having an upper face and a front face. This tread pattern provides reduced wear of the trailing edges of the blocks and less stone trapping.

U.S. Pat. No. 8,181,682 B2 describes a pneumatic tyre provided with main grooves extending in the tyre circumferential direction and transverse grooves connected to the main groove formed on a tread, and with blocks formed by the main grooves and the transverse grooves, wherein the phase difference of the two transverse grooves connected to the main groove is within 25% of the circumferential length of the blocks. U.S. Pat. No. 6,920,906 B2 describes a pneumatic tyre having a tread pattern for use on both on-road and off road vehicles. A sidewall reinforcing tread has a first set of lugs extending the inner tread surface and other two lugs having taper towards the sidewall. US 2017/0120685 A1 describes a pneumatic tyre with width direction sipes and width direction grooves. US 20170174007 A1 describes a pneumatic tyre that includes first and second side blocks formed respectively on a side portion such that the first and second side blocks extend toward the inside in a tyre radial direction from a tread shoulder portion.

U.S. Pat. No. 9,969,224 B2 describes a vehicle tyre having outer shoulders and two tread halves. The tyre includes a tread having six block rows and a plurality of circumferential grooves. Mutually adjacent ones of the block rows are separated from each other by a corresponding one of the plurality of circumferential grooves. Each of the block rows has individual blocks separated from each other by mutually parallel essentially straight transverse grooves running at an angle to the axial direction of the tyre. The circumferential grooves include first circumferential grooves having a maximum profile depth and second circumferential grooves having a second profile depth less than the maximum profile depth. The transverse grooves have a depth approximately corresponding to a maximum profile depth at first outlet locations. The transverse grooves have a depth corresponding to the second profile depth at second outlet locations.

JP 2016022807 A describes a pneumatic tyre, in which at least five rows of land parts are partitioned by four main grooves, wherein the sipe density of the intermediate land parts is larger than sipe density of the center land part and shoulder land parts.

Further, numerous tyres are on the market. An example is the all-terrain tyre T/A KO2 (BFGoodrich). This tyre has wavy grooves in the shoulder blocks of the tread. However, such grooves decrease the stiffness of the block.

Optimizing the tread for traction normally results in trade-off in noise generation. Further, increasing groove volume for improving running performance on soft underground such as mud, usually referred to as "wet performance", decreases the pattern rigidity of the tread and results in trade-off in steering stability on a dry road surface. There is thus a permanent need for an all terrain tyre providing improved traction, particularly on soft surfaces such as mud or sand, and a reduction of noise. Further performances needing improvement include water drainage and dry performance.

It is thus an object of the invention to provide a tyre with a good traction on a variety of terrains. The tyre further should provide noise reduction and good dry performance.

The object is accomplished by a pneumatic tyre according to claim 1. Preferred embodiments of the invention are given by the dependent claims, which can constitute each solely or in combination an aspect of the invention.

Accordingly, a pneumatic tyre is provided, the tyre having a circumferential direction, an axial direction and an equatorial plane (E), and the tyre comprising:
  a tread extending in a tyre circumferential direction, said tread comprising
  at least one circumferential groove running continuously in the circumferential direction, and a plurality of axial grooves or transverse grooves running at an angle to the axial direction, and a plurality of blocks defined by the circumferential groove and the axial grooves or transverse grooves, said blocks extending radially between an inner surface of the tread and a tread surface to come into contact with the ground, wherein at least some of the blocks comprise at least one wavy groove that extends from a circumferential groove inwardly into the block, and wherein the wavy groove has a depth extending radially from the tread surface to come into contact with the ground towards the inner surface that ends above the inner surface of the tread.

The tread pattern comprising the wavy grooves extending from a circumferential groove inwardly into the block provides improved traction of the tyre on multiple terrain types. It is assumed that the wavy groove reduces the stiffness of the block provided therewith and particularly helps to improve the wet performance and off road performance of the tyre. The pneumatic tyre is usable for a wide variety of vehicle tyres such as on road, off road and mud terrain tyres, and in particular for an all-terrain vehicle. The wavy groove has a depth extending radially from the ground contacting surface towards the inner surface. The depth ends above the inner surface. The wavy groove thus is less deep than the circumferential grooves. The depth of the wavy groove ending above the inner surface improves the stiffness of the block. The depth of the wavy groove may range from 10% to 90%, preferably from 20% to 50%, relative to the height of the block.

As used herein, the term "circumferential direction" refers to the direction along the tyre rolling movement. As used herein, the term "axial direction" refers to the direction along the tyre axis. As used herein, the term "radial direction" refers to the direction from the tyre central point to the tread.

As used herein, the term "tread" refers to a molded rubber component which, when bonded to a tyre casing, includes that portion of the tyre that comes into contact with the road when the tyre is normally inflated and under normal load.

As used herein, the term "groove" refers to an elongated void area in a tread that may extend longitudinally or circumferentially or may extend laterally about the tread in a straight, curved, or zigzag manner Grooves may be of varying depths in a tyre. As used herein, the term "circumferential groove" refers to continuous longitudinal grooves which are oriented in the circumferential direction.

As used herein, the term "sipe" refers to a narrow groove or an incision in the ground contacting surface of a block, being relatively small with respect to the grooves. Sipes may close completely in a tyre footprint. Sipes may have the same amplitude and wavelength between sizes, wherein the total length or the number of waves can differ. Usually, depending on tread width, larger tread blocks comprise longer sipes.

As used herein, the term "tie-bar" refers to an extra thickness of rubber at the bottom of a groove such that, in the location where the extra rubber is present, the groove depth is less than the groove depth at other locations.

As used herein, the term "pitch" refers to a repetitious geometrical pattern of a tyre tread that is arranged in a circular array about the circumference of a tyre.

Generally, tyres comprise one or more circumferential grooves running continuously in the circumferential direction and a plurality of axial and transverse grooves running at an angle to the axial direction, the circumferential and axial or transverse grooves thereby defining a plurality of tread blocks.

The tread may comprises on each side of the equatorial plane (E) a central circumferential groove running continuously in a zigzag manner in the circumferential direction, and a lateral circumferential groove running continuously in a zigzag manner in the circumferential direction, wherein the lateral circumferential groove is arranged outwardly of the central circumferential groove in the tyre axial direction. The circumferential grooves thereby define a center tread row delimited by the central circumferential grooves, a middle tread row arranged on each lateral side of the center tread row and delimited by the central circumferential groove and the lateral circumferential groove, and a shoulder tread row arranged on the lateral side of the of the middle tread row in the tyre axial direction. Each of the tread rows comprises a plurality of blocks, which blocks in each tread row being separated from each other by axial grooves or transverse grooves running at an angle, such as from 5° to 50°, to the axial direction.

Central and lateral circumferential grooves have a maximum profile depth extending radially between an inner surface of the tread and a tread surface to come into contact with the ground. The tread surface to come into contact with the ground in the following also is denoted ground contacting surface. At least the blocks of one of the middle tread row and the center tread row may comprise at least one wavy groove. The blocks of the middle tread row may comprise wavy grooves. For the middle blocks, the wavy grooves may extend from the central circumferential groove or the lateral circumferential groove inwardly into the blocks.

The wavy groove has a wavy outline. Such shape provides increased biting edges in different directions to improve traction on various terrains. Unlike the sipes, which usually have a uniform width along their length, the wavy groove has a width that is not uniform along the length of the wavy groove extending from a base in the circumferential groove to a tip in the block. The width of the wavy groove at the tip preferably is smaller than the width of the wavy groove at the base. The wavy groove may narrow along its length inwardly into the block.

The depth of the wavy grooves may vary along its length extending from a circumferential groove inwardly into the block. In embodiments, the depth of the wavy groove may decrease along its length inwardly into the block. An inwardly decreasing depth also improves the stiffness of the block. The wavy groove extending from a base at a circumferential groove inwardly into the block to a tip, may be less deep at the tip than at the base. Particularly, a wavy groove being narrower and less deep at the tip improves the stiffness of the block.

The wavy groove is formed as a non-continuous groove and terminates in the block body. The wavy groove may extend in transverse direction at an angle of from 10° to 50° to the axial direction.

In embodiments, the tyre tread comprises on each side of the equatorial plane (E) a central circumferential groove running continuously in a zigzag manner in the circumferential direction, and a lateral circumferential groove running continuously in a zigzag manner in the circumferential direction, wherein the lateral circumferential groove is arranged outwardly of the central circumferential groove in the tyre axial direction; and a center tread row delimited by the central circumferential grooves, a middle tread row arranged on each lateral side of the center tread row and delimited by the central circumferential groove and the lateral circumferential groove, and a shoulder tread row arranged on the lateral side of the of the middle tread row in the tyre axial direction; each of the tread rows comprising a plurality of blocks, said blocks in each tread row being separated from each other by axial grooves or transverse grooves running at an angle, such as from 5° to 50°, to the axial direction; wherein the blocks of the middle tread row comprise a wavy groove, and wherein the wavy grooves preferably alternatingly extend from the central circumferential groove or the lateral circumferential groove inwardly into the blocks. The position of the wavy grooves in the blocks of the middle tread row provides for a stiff block and a biting edge. Particularly on snow and soft surfaces, for example, the alternating positions of the wavy grooves provide biting edges in different directions.

Each block comprises a ground contact surface and several side surfaces, including a leading side wall and a trailing side wall and at least two longitudinal side walls facing the circumferential grooves. In embodiments, the blocks have a single step constructed as a recess of the ground contacting surface of the block in at least one of the longitudinal and lateral grooves. In embodiments, at least a leading side wall, a trailing side wall or at least a portion of one or two longitudinal side walls of the middle blocks comprise a step. Steps on the leading side wall and trailing side wall of the blocks, such as the middle blocks, protrude into the transverse grooves separating the blocks. In such embodiments, the tread is provided with steps in a substantially axial direction. Steps on the longitudinal side walls protrude into the central circumferential grooves or lateral circumferential grooves. The tread may comprise steps on the face of the zigzag longitudinal grooves. Particularly the shoulder blocks may comprise a step protruding into the lateral circumferential grooves. The steps help prevent stone trapping in the tread. The step may have a height extending radially from the inner surface ranging from 30% to 70%, preferably from 40% to 60%, relative to the height of the block. The step thus does not extend to the tread surface.

In embodiments, at least a portion of one or more longitudinal side walls of the middle blocks comprises a step, and the wavy groove is arranged on said portion of the longitudinal side wall and has a depth extending in radial direction from the tread surface to the step. The wavy grooves end at a depth above the bottom of the circumferential grooves. In embodiments, a step of a height corresponding to the depth of the wavy grooves protrudes on the face of the blocks towards the circumferential grooves. In these embodiments the wavy groove ends on said step. In embodiments, the wavy grooves end at a varying depth. In embodiments, the varying depth is decreasing as the wavy groove narrows along its length. In embodiments, a step of a height corresponding to the maximum depth of the wavy grooves protrudes on the face of the blocks towards the circumferential grooves. In these embodiments the wavy groove ends on said step.

In embodiments, the center blocks comprise at least one multi-step area on a longitudinal block side wall, the multi-step area protruding into the central circumferential grooves and comprising at least two or three steps above the inner surface. The multi-step area can prevent stone trapping, and help reduce pipe resonance.

The tread comprises central and lateral circumferential grooves. In embodiments, the pitch of the central circumferential groove is higher than the pitch of the lateral circumferential groove. The groove design may ensure water drainage on wet roads, and provide better control during off road driving. It is assumed that the tread design comprising two central circumferential grooves on either side of an equatorial plane, said grooves having a larger number of pitches than the two lateral circumferential grooves, improves hydroplaning, and provides for more traction generation that allows to improve traction on mud or snow.

The central and lateral circumferential grooves may have a twisted groove faces opening towards the radial and longitudinal directions, which may prevent stone trapping, and improve water drainage.

Each of the tread rows comprises a plurality of blocks, which blocks in each tread row are separated from each other by axial grooves or transverse grooves. The center blocks may be arranged in pairs of adjacent tread blocks, wherein each pair of center blocks in longitudinal direction is separated from the following pair by an axial groove. The blocks of each pair of center blocks may be separated from each other by a transverse groove. The middle blocks may be arranged in pairs of adjacent tread blocks, wherein each pair of middle blocks in longitudinal direction is separated from the following pair by a transverse groove. The blocks of each pair of center blocks may be separated from each other by a transverse groove. Also the shoulder blocks may be arranged in pairs of adjacent tread blocks, wherein each pair of shoulder blocks in longitudinal direction is separated from the following pair by an axial or transverse groove.

At least one of the center blocks, the middle blocks or the shoulder blocks comprise at least one zigzag shaped 3D sipe. Preferably, the center blocks, the middle blocks and the shoulder blocks comprise a plurality of zigzag shaped 3D sipes. Sipes formed as so-called 3D (three-dimensional) sipes are sipes whose shape changes in the depth direction. 3D sipes have a linear or wavy surface shape and inclined surfaces in the depth direction, the radial direction of the block. When longitudinal force such as braking or traction force is applied to the tyre, the walls of the inclined surfaces of the 3D sipes come into close contact with each other, thereby improving the stiffness of the block. The additional stiffness improves the dry handling. Further, the biting edges improve grip on all terrain.

The 3D sipes in the center and middle blocks may run in transverse direction at an angle, such as of from 8° to 30°, relative to the axial direction. The 3D sipes in the shoulder blocks inwardly from the tread edge may run in transverse direction at an angle, such as of from 0° to 20°, relative to the axial direction. The 3D sipes in the shoulder blocks outwardly from the tread edge on the side walls may run in substantial axial direction. Sipes running in these various directions provide multi directional block edges and can provide better traction on off road conditions.

In embodiments, the center blocks, the middle blocks and the shoulder blocks comprise a plurality of zigzag shaped 3D sipes, wherein the sipe density in the middle tread row is configured to be larger than the sipe density in the shoulder tread row. Higher sipe density in the center tread row and the middle tread row is considered to balance performance of wear, rolling resistance and traction.

In embodiments, the sipe density in the middle tread row is configured to be larger than the sipe density in the center tread row. Highest sipe density in the middle tread row is considered to particularly improve the traction of the tyre, while a lower sipe density in the shoulder and center rows may be considered to balance wear.

In embodiments where the blocks are arranged in pairs of blocks the blocks of each pair being denoted a and b, respectively, the sipe density $D_R$ for each pair of blocks (pitch) per tread row may be determined by the following equation (1):

$$D_R = (\Sigma L_i/(A_a+A_b)) \times 100, \text{ for } i=\{1,2,\ldots,n\} \tag{1}$$

where, for one of the repeating pitches, n is the total number of sipes on one pair of blocks a and b, belonging to one pitch, $L_i$ is the cord length of each sipe i measured assuming that all individual sipe segments are extended along a straight line, $A_a$ is the surface area of the block a of the block pair, $A_b$ is the surface area of the block a of the block pair, wherein the surface areas $A_a$ and $A_b$ are the total surface areas calculated for the block having no 3D sipes and having the surface area of the wavy groove removed.

The sipe density for each of the tread rows $D_{Wk}$, such as the center tread row, the middle tread row and the shoulder tread row, may be determined by the following equation (2):

$$D_{Wk}=(\Sigma D_{Rjk}), \text{ for } j=\{1,2,\ldots,m\}; k=\{1,2,3\} \qquad (2)$$

where:

m is the total number of pitches in the tread row k, and $D_R$ is the sipe density for each pitch (pair of blocks) per tread row provided from Eq. (1).

The sipe density $D_R$ units are inverse, e.g., if all the length measurements are in millimeters, then the sipe density units are $mm^{-1}$. In embodiments, the sipe density $D_R$ in the center tread row may range from 3 $mm^{-1}$ to 9 $mm^{-1}$, preferably from 4 $mm^{-1}$ to 8 $mm^{-1}$. In embodiments, the sipe density $D_R$ in the middle tread row may range from 5 $mm^{-1}$ to 10 $mm^{-1}$, preferably from 6 $mm^{-1}$ to 9 $mm^{-1}$. In embodiments, the sipe density $D_R$ in the shoulder tread row may range from 4 $mm^{-1}$ to 9 $mm^{-1}$, preferably from 5 $mm^{-1}$ to 8 $mm^{-1}$.

In embodiments of a tyre for a passenger car, the sipe density $D_R$ in the center tread row may range from 6 $mm^{-1}$ to 9 $mm^{-1}$, sipe density $D_R$ in the middle tread row may range from 8 $mm^{-1}$ to 10 $mm^{-1}$, and/or and sipe density $D_R$ in the shoulder tread row may range from 7 $mm^{-1}$ to 9 $mm^{-1}$.

In embodiments of a tyre for a light truck, the sipe density $D_R$ in the center tread row may range from 5 $mm^{-1}$ to 7 $mm^{-1}$, sipe density $D_R$ in the middle tread row may range from 5 $mm^{-1}$ to 7 $mm^{-1}$, and/or sipe density $D_R$ in the shoulder tread row may range from 3 $mm^{-1}$ to 5 $mm^{-1}$.

In embodiments, the center blocks are arranged in pairs of adjacent tread blocks, wherein each pair of center blocks in longitudinal direction is separated from the following pair by an axial groove and each single center block is separated from the other block of the pair by a transverse groove, wherein the transverse groove has a segmented Z-shaped form.

In embodiments, the middle blocks are arranged in pairs of adjacent tread blocks, wherein each pair of middle blocks in longitudinal direction is separated from the following pair by a transverse groove and each single middle block is separated from the other block of the pair by a transverse groove, wherein the transverse groove has a segmented Z-shaped form.

The segmented Z-shaped form of the transverse grooves that separates the respective individual blocks of the central and middle block pair provides for three segments of the Z-line that provide three biting edges of different directions. The change of direction increases the number of biting edges which improves traction.

In embodiments, the transverse grooves separating the respective individual blocks of the central and middle block pair have a tie bar therein. Tie bars in the transverse grooves link block pairs and bridge the groove between the individual blocks of a block pair. The tie bars provide a higher stiffness of the tread rows. The radial height, the height extending radially from the inner surface of the tread, of the tie bars in the transverse and axial grooves generally may range from 35% to 65% relative to the height of the adjacent blocks of the respective row. The radial height of the tie bar in the transverse grooves of center tread row may be greater than the radial height of the tie bars in the transverse grooves of middle tread rows. The radial height of the tie bar in the transverse grooves in the center tread row may range from 45% to 55%, relative to the height of the center blocks. The radial height of the tie bar in the transverse grooves in the middle tread row may range from 40% to 50%, relative to the height of the middle blocks. In embodiments, the axial grooves separating the block pairs of the central tread row have a tie bar therein. The radial height of the tie bar in the axial grooves in the center tread row may range from 40% to 50%, relative to the height of the center blocks. Preferably, the tie bars will not extend over the full length of a groove, but extend only along the center portion of the groove, ending at a short distance before the respective ends of a groove.

In embodiments, at least some of the blocks, for example every second block, of the shoulder row comprises a recess along the tread edge, wherein the recess has a length $l_r$ extending longitudinally from the block edge ranging from 30% to 60%, preferably from 40% to 50%, relative to the longitudinal length $l_b$ of the block. Such recess may provide better traction on soft surfaces, such as mud, sand and snow.

In embodiments, at least some of the blocks of the shoulder row comprise a recess on the tread shoulder, the recess extending inwardly from the surface of the tread shoulder. The recess may have at least one side measured in a substantially longitudinal direction of a length $l_{tr}$ ranging from 20% to 80%, preferably from 30% to 70%, relative to the longitudinal length $l_b$ of the block. Such recesses may provide better traction on soft surfaces. The recess may have a cylindrical or oblong form, or may be triangular.

In embodiments, at least some of the blocks of the shoulder row comprise a protrusion on the tread shoulder, the protrusion extending outwardly from the surface of the tread shoulder. The protrusion may have a surface area of 2% to 5% with respect to the surface of the entire tread block to which particular protrusion belongs. Such protrusions may improve the traction on soft surfaces. The protrusion may have a cylindrical or oblong form, or may be triangular.

In embodiments, the tread may comprise a triangular recess, and a plurality of smaller triangular protrusions not aligned towards the radial direction. The tread may have a substantially uniform exterior lug surfaces in the axial direction. The tread may comprise a tread shoulder portion having tread blocks at a substantially equal level, that are not axially protruding and that substantially follow the contour of the tyre sidewall. Said tread shoulder may extend radially outward from a sidewall edge to a tread edge.

In the following the invention is explained in detail by the examples and drawings showing preferred embodiments of the present invention, wherein each feature can constitute solely or in combination an aspect of the invention. In the drawings:

FIG. 1: is a simplified schematic view of a pneumatic tyre for an all-terrain vehicle.

Figure 2:
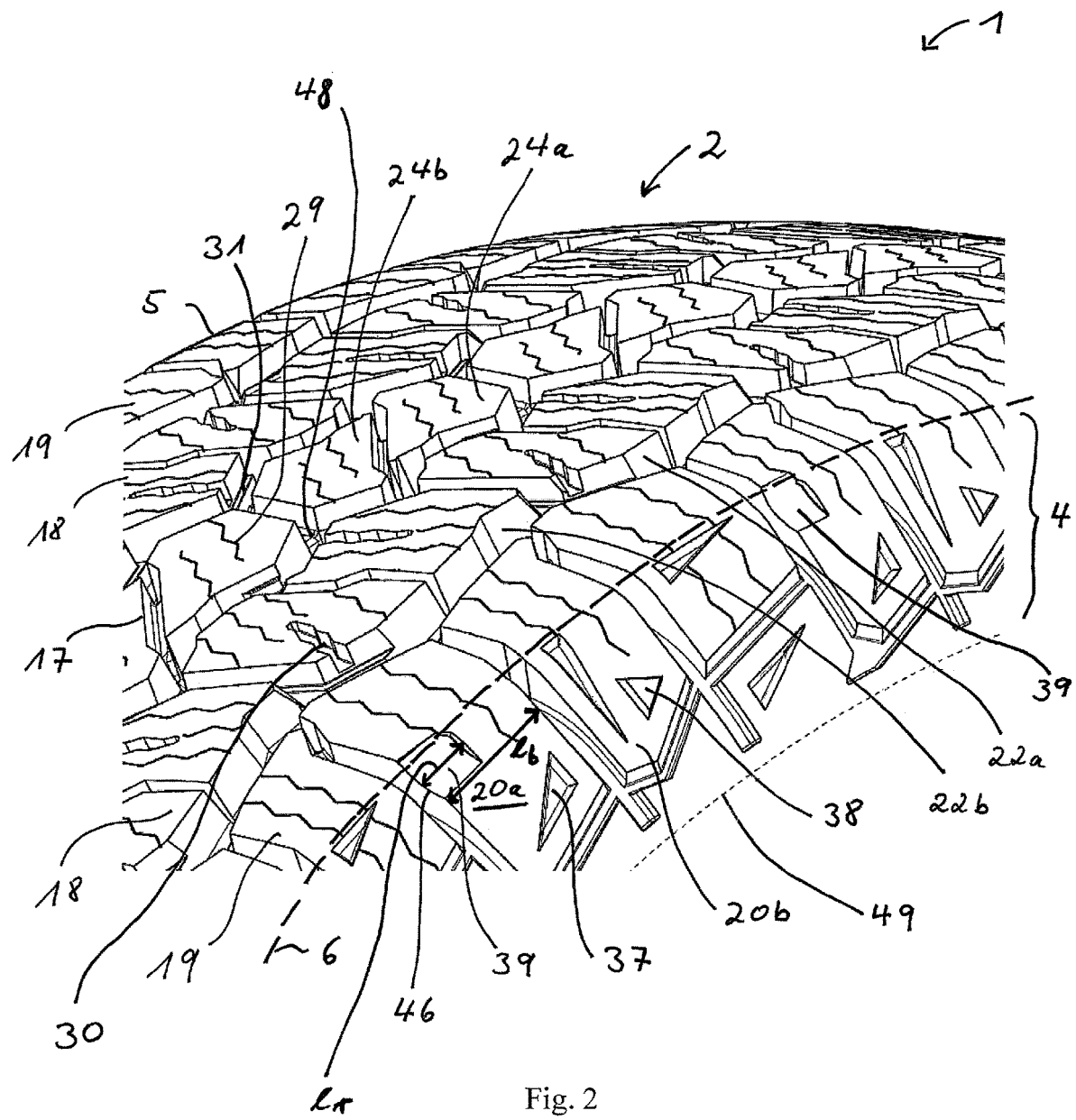

FIG. 2: is a schematic perspective view of a pneumatic tyre for an all-terrain vehicle.

Figure 3:
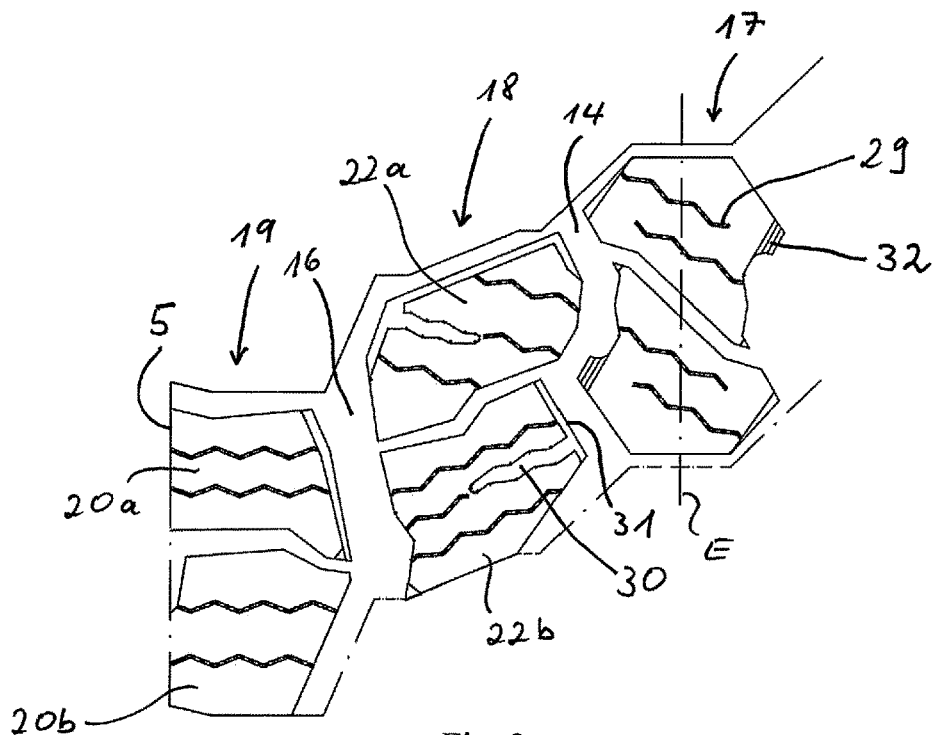

FIG. 3: is a schematic view of a pair of blocks of shoulder, middle and center row of a tread for a passenger car tyre.

Figure 4:
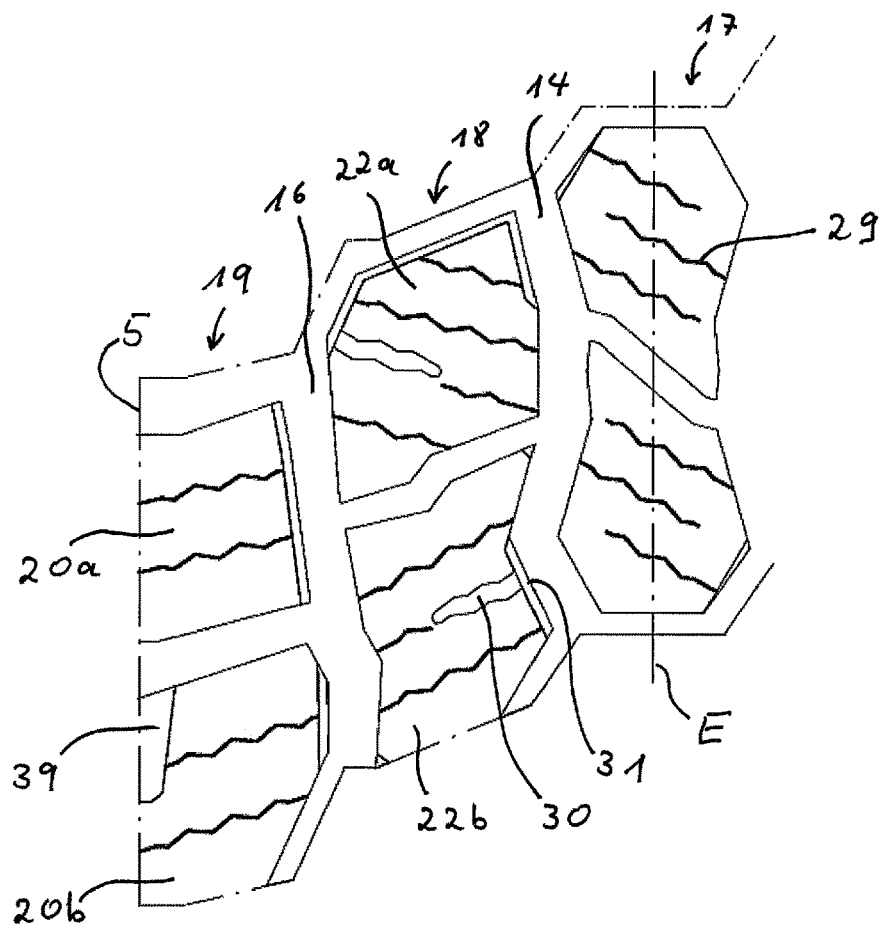

FIG. 4: is a schematic view of a pair of blocks of shoulder, middle and center row of a tread for a light truck tyre.

The FIG. 1 illustrates a tyre tread 2 for an all-terrain vehicle having a circumferential direction, an axial direction and an equatorial plane E. The tread has first lateral tread edge 5 and a second lateral tread edge 6. The tyre comprises a tread 2 extending in a tyre circumferential direction. The tread 2 comprises on each side of the equatorial plane E a central circumferential groove 14 running continuously in a zigzag manner in the circumferential direction, and a lateral circumferential groove 16 running continuously in a zigzag manner in the circumferential direction. The lateral circumferential groove 16 is arranged outwardly of the central circumferential groove 14 in the tyre axial direction. The pitch of the central circumferential groove 14 is higher than the pitch of the lateral circumferential groove 16. Central and lateral circumferential grooves 14 and 16 have a maximum profile depth extending radially between an inner surface 26 of the tread 2 and a tread surface 33 to come into contact with the ground.

A center tread row 17 is delimited by the central circumferential grooves 14. A middle tread row 18 arranged on each lateral side of the center tread row 17 is delimited by the central circumferential groove 14 and the lateral circumferential groove 16. A shoulder tread row 19 is arranged on the lateral side of the of the middle tread row 18 in the tyre axial direction. Each of the tread rows 17, 18, 19 comprises a plurality of blocks 20a, 20b, 22a, 22b, 24a, 24b. The plurality of blocks 20a, 20b, 22a, 22b, 24a, 24b is defined by the circumferential groove 14, 16 and the axial grooves 34 or transverse grooves 35, 36. The blocks 20a, 20b, 22a, 22b, 24a, 24b in each tread row 17, 18, 19 are separated from each other by axial grooves 34 or transverse grooves 35, 36 running at an angle of from 5° to 50° to the axial direction.

The blocks 20a, 20b, 22a, 22b, 24a, 24b extend radially between an inner surface 26 of the tread 2 and a tread surface 33 to come into contact with the ground. The blocks 22a, 22b of the middle tread row 18 comprise a wavy groove 30 that extends from the circumferential groove 14, 16 inwardly into the block 22a, 22b, whereby the wavy groove 30 narrows along its length. The wavy grooves 30 alternatingly extend from the central circumferential groove 14 or the lateral circumferential groove 16 inwardly into the blocks 22a, 22b. The wavy groove 30 has a depth decreases along its length inwardly into the block 22a, 22b. The wavy groove 30 is less deep at the tip 52 than at the base 50. The wavy grooves 30 extend in transverse direction at an angle of from 10° to 50° to the axial direction.

Each block comprises a ground contact surface 33 and a leading side wall 42 and a trailing side wall 44 and at least two longitudinal side walls 40 facing the circumferential grooves. The leading side wall 42, or the trailing side wall 44 and at least a portion of one or two of the longitudinal side walls 40 of the middle blocks 22a, 22b comprise a step 31. The steps 31 on the leading side wall 42 and trailing side wall 44 protrude into the transverse grooves 36. The steps 31 on the longitudinal side walls 40 protrude into the central circumferential grooves 14 or lateral circumferential grooves 16. Also the shoulder blocks 20a, 20b comprise a step 31 protruding into the lateral circumferential grooves 16. The wavy groove 30 is arranged on a portion of the longitudinal side wall 40 and has a depth extending in radial direction from the tread surface 33 to the step 31.

The center blocks 24a, 24b each comprise a multi-step area 32 on a longitudinal block side wall 40. The multi-step area 32 protrudes into the central circumferential grooves 14 and comprises three steps above the inner surface 26.

The center blocks 24a, 24b are arranged in pairs of adjacent tread blocks, wherein each pair of center blocks 24a, 24b in longitudinal direction is separated from the following pair 24a, 24b by an axial groove 34 and each single center block 24a, 24b is separated from the other block of the pair by a transverse groove 35. Also the middle blocks 22a, 22b are arranged in pairs of adjacent tread blocks, wherein each pair of middle blocks 22a, 22b in longitudinal direction is separated from the following pair 22a, 22b by a transverse groove 36 and each single middle block 22a, 22b is separated from the other block of the pair by a transverse groove 35. The transverse grooves 35 have a segmented Z-shaped form.

The FIG. 2 illustrates a schematic perspective view of a pneumatic tyre for an all-terrain vehicle. The tyre 1 comprises a tread 2 extending in a tyre circumferential direction. The tread 2 comprises a center tread row 17, a middle tread row 18 arranged on each lateral side of the center tread row 17 and a shoulder tread row 19 arranged on the lateral sides of the of the middle tread rows 18 in the tyre axial direction. The center blocks 24a, 24b are arranged in pairs of adjacent tread blocks, wherein each pair of center blocks 24a, 24b in longitudinal direction is separated from the following pair 24a, 24b by an axial groove 34 and each single center block 24a, 24b is separated from the other block of the pair by a transverse groove 35. The axial grooves separating the block pairs of the central tread row have a tie bar 46 therein. The center blocks 24a, 24b, the middle blocks 22a, 22b and the shoulder blocks 22a, 22b comprise zigzag shaped 3D sipes 29.

Some of the blocks 20a of the shoulder row 19 comprise a recess 39 along the tread edge 6, wherein the recess 39 has a length $l_r$ extending longitudinally from the block edge 46 of about 40% to 50%, relative to the longitudinal length $l_b$ of the block 20a. Some of the blocks 20a, 20b of the shoulder row 19 comprise a triangular recess 37 on the tread shoulder 4, the triangular recess 37 extending inwardly from the surface of the block 20a, 20b. Some of the blocks 20a, 20b of the shoulder row 19 comprise a triangular protrusion 38 on the tread shoulder 4, the triangular protrusion 38 extending outwardly from the surface of the block 20a, 20b. The tread 2 has a substantially uniform exterior block surfaces in the axial direction.

Illustrated in FIG. 3 is a schematic view of a pair of blocks of shoulder, middle and center row of a tread for a passenger car tyre. The center blocks 24a, 24b, the middle blocks 22a, 22b and the shoulder blocks 22a, 22b comprise a plurality of zigzag shaped 3D sipes 29. The sipe density in the blocks 22a, 22b of the middle tread row 18 is larger than the sipe density in the blocks 20a, 20b of the shoulder tread row 19. Particularly, the sipe density of the blocks 22a, 22b of middle tread row 18 is larger than the sipe density in the blocks 24a, 24b of the center tread row 17.

Illustrated in FIG. 4 is a schematic view of a pair of blocks of shoulder, middle and center row of a tread for a light truck tyre. The center blocks 24a, 24b, the middle blocks 22a, 22b and the shoulder blocks 22a, 22b comprise a plurality of zigzag shaped 3D sipes 29. The sipe density in the blocks 22a, 22b of the middle tread row 18 is larger than the sipe density in the blocks 20a, 20b of the shoulder tread row 19. Further, the sipe density of the blocks 22a, 22b of middle tread row 18 is larger than the sipe density in the blocks 24a, 24b of the center tread row 17.

EXAMPLES

Sample sets of prototype pneumatic tyres 265/70R17 light truck tyres (LT 1, 2, 3, 4) and passenger car tyres (PCT 1, 2, 3, 4) having the basic tread pattern as illustrated in FIG. 4 and FIG. 3, respectively, were manufactured and outdoor performance was tested. Typical depth values for wavy grooves in the examples were from 19% to 43%. Outdoor testing included the following performance tests: R117 noise testing measuring noise values in dB(A) measured by instrument, testing of in cabin noise rated by expert assessment, dry handling rated by expert assessment, off road sand and mud performance rated by expert assessment, snow braking determining the objective braking distance, stone release tests rating the stone count after transit on gravel based on visual control, off road traction on gravel rated by expert assessment, aquaplaning determining the speed, wet breaking determining the objective braking distance, and wet handling rated by expert assessment.

Example 1: Outdoor Testing On-Road Evaluation

A sample set of four prototype light truck tyres 265/70R17 (LT 1) were mounted on a rim and fitted on a vehicle. A set of four prior art tyres size 265/70R17 (Ref 1) were mounted on a rim fitted on a vehicle and used as control and outdoor performance was tested for both tyre sets under identical conditions. For this experiment, the tyres were tested on an outdoor proving ground using the above test procedures. The table 1 below shows the test results of the tyres LT 1 in comparison to the reference tyres Ref 1. For the subjective ratings, the higher the score, the better the performance is.

TABLE 1 on-road evaluation of light truck tyres

| Pattern/Construction | Ref 1 | LT 1 |
|---|---|---|
| Size | LT 265/70R17 | LT 265/70R17 |
| Spec | LT - Reference set | LT |
| Subjective Noise Rating | 6.75 | 7.00 |
| Lateral Hydroplane Rating | 7.00 | 7.25 |
| Lateral Hydroplane Speed (kph) | 88.51 | 90.12 |
| Wet Handling Rating | 6.75 | 7.25 |
| Wet Handling Lap Time (avg) | 61.20 | 60.30 |
| Wet Lateral Circle G | 0.56 | 0.60 |
| Lane Change Speed (kph) | 90 | 93 |
| Lane Change Rating | 7.00+ | 7.5 |
| Dry Max Handling Rating | 7.00+ | 7.5 |

As apparent from the test results as shown in Table 1, the example tyres showed improved levels of noise, wet performance, dry performance and limit handling capacity.

Example 2: Outdoor Testing Off Road Evaluation

A sample set of four prototype light truck tyres 265/70R17 (Proto 1) were mounted on a rim and fitted on a vehicle. A set of four prior art tyres size 265/70R17 (Ref 1) were mounted on a rim fitted on a vehicle and used as control and outdoor performance was tested for both tyre sets under identical conditions. For this experiment, the tyres were tested on an outdoor proving ground using the above test procedures.

The table 2 below shows the test results of the tyres LT 2 in comparison to the reference tyres 2. For the subjective ratings, the higher the score, the better the performance is.

TABLE 2 off road evaluation of light truck tyres

| Pattern/Construction | Ref 2 | LT 2 |
|---|---|---|
| Size | LT 265/70R17 | LT 265/70R17 |
| Spec | LT - Reference set | LT |

TABLE 2-continued off road evaluation of light truck tyres

| Pattern/Construction | Ref 2 | LT 2 |
|---|---|---|
| Loose Hill Climb Ability | 6.75 | 7 |
| Side Slip/Side Slope Traction | 7 | 7 |
| Gravel Bin Traction | 6.5 | 6.75 |
| Sand Bin Traction | 7 | 7.25 |
| Steering ability/side-bite ability | 7 | 7 |
| Front path stability | 7 | 7.25 |
| Forward traction/acceleration traction (Rock Surface) | 7 | 7 |
| Mechanical Envelopment/Lug Engagement | 6.75 | 7.25 |
| Overall Rating | 6.75 | 7.00 |

As apparent from the test results as shown in Table 2, the example tyres showed a noticeable increase in tread lug engagement on irregular rock/boulder surfaces, with increased outboard shoulder traction availability. The example tyres further showed lightly higher front path stability and lateral holding ability using smaller sections of contact patch than the reference tyres.

Example 3: Outdoor Testing of Mud Acceleration and Steering

A sample set of four prototype light truck tyres 265/70R17 (LT 3) were mounted on a rim and fitted on a vehicle. A set of four prior art tyres size 265/70R17 (Ref 3) were mounted on a rim fitted on a vehicle and used as control. Outdoor performance was tested for both tyre sets under identical conditions. For this experiment, the tyres were tested on an outdoor proving ground using the above test procedures.

The table 3 below shows the test results of the tyres LT 3 in comparison to the reference tyres Ref 3. For the subjective ratings, the higher the score, the better the performance is.

TABLE 3 mud acceleration and steering of light truck tyres

| Pattern/Construction | Ref 3 | LT 3 |
|---|---|---|
| Size | LT 265/70R17 | LT 265/70R17 |
| Spec | LT - Reference set | LT |
| Initial Forward Acceleration (Low Wheel Speed) | 6.5 | 7 |
| Forward Acceleration (High Wheel Speed) | 6.75 | 7 |
| Steering Response & Precision | 7 | 7 |
| Controllability | 6.75 | 7 |
| Overall Rating | 6.75 | 7.00 |

As apparent from the test results as shown in Table 3, the example tyres showed a noticeable increase in initial forward acceleration/material moving capability at low wheel speed, providing for higher longitudinal acceleration from standstill. The example tyres further showed an improved overall controllability compared to the prior art group, with reduced rear axle yaw movement/lateral movement during initial acceleration.

Example 4: Outdoor Testing of Snow Performance

A sample set of four prototype light truck tyres 265/70R17 (LT 4) were mounted on a rim and fitted on a vehicle. A set of four prior art tyres size 265/70R17 (Ref 4) were mounted on a rim fitted on a vehicle and used as control.

Outdoor performance was tested for both tyre sets under identical conditions. For this experiment, the tyres were tested on an outdoor proving ground using the above test procedures.

The table 4 below shows the test results of the tyres LT 4 in comparison to the reference tyres Ref 4. For the subjective ratings, the higher the score, the better the performance is.

TABLE 4 snow performance of light truck tyres

| Pattern/Construction | Ref 4 | LT 4 |
|---|---|---|
| Size | LT 265/70R17 | LT 265/70R17 |
| Spec | LT - Ref. set | LT |
| Braking snow ABS | 100% | 105% |
| Acc snow with ESP | 100% | 110% |

As apparent from the test results as shown in Table 4, the example tyres showed improved levels of snow braking and acceleration compared to the reference.

Example 5: Outdoor Testing On-Road Evaluation

A sample set of four prototype passenger car tyres 265/70R17 (PCT 1) were mounted on a rim and fitted on a vehicle. A set of four prior art tyres size 265/70R17 (Ref 5) were mounted on a rim fitted on a vehicle and used as control and outdoor performance was tested for both tyre sets under identical conditions. For this experiment, the tyres were tested on an outdoor proving ground using the above test procedures.

The table 5 below shows the test results of the tyres PCT 1 in comparison to the reference tyres Ref 5. For the subjective ratings, the higher the score, the better the performance is.

TABLE 5 on-road evaluation of passenger car tyres

| Pattern/Construction | Ref 5 | PCT 1 |
|---|---|---|
| Size | P 265/70R17 | P 265/70R17 |
| Spec | PCT - Ref. set | PCT |
| Ride | 7.00 | 7.25− |
| Steering/Light Handling | 6.75 | 7.50+ |
| Lateral Hydroplane Rating | 7.00+ | 7.25 |
| Lateral Hydroplane Speed (kph) | 85.30 | 86.90 |
| Wet Handling Rating | 6.75 | 7.25+ |
| Wet Handling Lap Time (avg) | 60.63 | 59.53 |
| Wet Lateral Circle G | 0.62 | 0.62 |
| Lane Change Speed (kph) | 92 | 100 |
| Lane Change Rating | 7 | 7.5 |
| Dry Max Handling Rating | 7 | 7.5 |

As apparent from the test results as shown in Table 5, the example tyres showed improved levels of ride, steering, wet performance, dry performance and limit handling capacity.

Example 6: Outdoor Testing Off Road Evaluation

A sample set of four prototype passenger car tyres 265/70R17 (PCT 2) were mounted on a rim and fitted on a vehicle. A set of four prior art tyres size 265/70R17 (Ref 6) were mounted on a rim fitted on a vehicle and used as control and outdoor performance was tested for both tyre sets under identical conditions. For this experiment, the tyres were tested on an outdoor proving ground using the above test procedures.

The table 6 below shows the test results of the tyres PCT 2 in comparison to the reference tyres 6. For the subjective ratings, the higher the score, the better the performance is.

TABLE 6 off road evaluation of passenger car tyres

| Pattern/Construction | Ref 6 | PCT 2 |
|---|---|---|
| Size | P 265/70R17 | P 265/70R17 |
| Spec | PCT - Ref. set | PCT |
| Loose Hill Climb Ability | 6.75 | 7 |
| Side Slip/Side Slope Traction | 7 | 7.25 |
| Gravel Bin Traction | 6.5 | 6.75 |
| Sand Bin Traction | 7.25 | 7.25 |
| Steering ability/side-bite ability | 7 | 7.25 |
| Front path stability | 7 | 7 |
| Forward traction/acceleration traction (Rock Surface) | 7 | 7 |
| Mechanical Envelopment/Lug Engagement | 6.75 | 7.25 |
| Overall Rating | 6.75 | 7.00 |

As apparent from the test results as shown in Table 6, the example tyres showed increased mechanical edge envelopment compared to prior art group, showing reduced tread lug skipping, and higher loose hill climbing ability, gravel bin traction showing some improvement compared to control tyre group, with higher forward grip and equal sand acceleration performance.

Example 7: Outdoor Testing of Mud Acceleration and Steering

A sample set of four prototype passenger car tyres 265/70R17 (PCT 3) were mounted on a rim and fitted on a vehicle. A set of four prior art tyres size 265/70R17 (Ref 7) were mounted on a rim fitted on a vehicle and used as control. Outdoor performance was tested for both tyre sets under identical conditions. For this experiment, the tyres were tested on an outdoor proving ground using the above test procedures.

The table 7 below shows the test results of the tyres PCT 3 in comparison to the reference tyres Ref 7. For the subjective ratings, the higher the score, the better the performance is.

TABLE 7 mud acceleration and steering of passenger car tyres

| Pattern/Construction | Ref 7 | PCT 3 |
|---|---|---|
| Size | P 265/70R17 | P 265/70R17 |
| Spec | PCT - Ref. set | PCT |
| Initial Forward Acceleration (Low Wheel Speed) | 6.75 | 7.25 |
| Forward Acceleration (High Wheel Speed) | 6.75 | 7.25 |
| Steering Response & Precision | 7 | 7 |
| Controllability | 6.75 | 7 |
| Overall Rating | 6.75 | 7.25 |

As apparent from the test results as shown in Table 7, the example passenger car tyres showed a large increase in initial forward acceleration, generating higher longitudinal grip at lower wheel speeds than prior art group. Improved cleaning ability at high & low speeds, with improved generating of forward grip.

Example 8: Outdoor Testing of Snow Performance of Passenger Car Tyres

A sample set of four prototype passenger car tyres 265/70R17 (PCT 4) were mounted on a rim and fitted on a vehicle. A set of four prior art tyres size 265/70R17 (Ref 8) were mounted on a rim fitted on a vehicle and used as control. Outdoor performance was tested for both tyre sets under identical conditions. For this experiment, the tyres were tested on an outdoor proving ground using the above test procedures.

The table 8 below shows the test results of the tyres PCT 4 in comparison to the reference tyres Ref 8. For the subjective ratings, the higher the score, the better the performance is.

TABLE 8 snow performance of passenger car tyres

| Pattern/Construction | Ref 8 | PCT 4 |
|---|---|---|
| Size | P 265/70R17 | P 265/70R17 |
| Spec | PCT - Ref. set | PCT |
| Braking snow ABS | 100% | 102.5% |
| Acc snow with ESP | 100% | 102% |

As apparent from the test results as shown in Table 8, the example passenger car tyres showed improved levels of snow braking and acceleration compared to benchmark.

Example 9: Determination of Sipe Density

The sipe density $D_R$ for each pair of blocks (pitch) 20a, 20b of the shoulder tread row, 22a, 22b of the middle tread row, and 24a, 24b of the center tread row, of the tread of a passenger car tyre as illustrated in FIG. 3 and a light truck tyre as illustrated in FIG. 4 was determined according to the equation (1):

$$D_R = (\Sigma L_i (A_a + A_b)) \times 100, \text{ for } i = \{1, 2, \ldots, n\} \quad (1).$$

TABLE 9 sipe densities of a passenger car tyre as illustrated in FIG. 3

| blocks | i | n | Σ Li | $A_a + A_b$ | $D_R$ |
|---|---|---|---|---|---|
| 20a, 20b | integer 1 to n | 4 | 131.2 mm | 1701.6 mm² | 7.71 mm⁻¹ |
| 22a, 22b | integer 1 to n | 6 | 153.1 mm | 1804.6 mm² | 8.48 mm⁻¹ |
| 24a, 24b | integer 1 to n | 4 | 105.9 mm | 1609.3 mm² | 6.58 mm⁻¹ |

This example illustrates a small pitch size of a pitch P1 of a passenger car tyre.

TABLE 10 sipe densities of a light truck tyre as illustrated in FIG. 4

| blocks | i | n | Σ Li | $A_a + A_b$ | $D_R$ |
|---|---|---|---|---|---|
| 20a, 20b | integer 1 to n | 4 | 143.8 mm | 2872.8 mm² | 5 mm⁻¹ |
| 22a, 22b | integer 1 to n | 7 | 207.6 mm | 3315 mm² | 6.26 mm⁻¹ |
| 24a, 24b | integer 1 to n | 6 | 182.6 mm | 2969.2 mm² | 6.15 mm⁻¹ |

This example illustrates a large pitch size of a pitch P4 of a light truck tyre.

LIST OF REFERENCE SIGNS 1 tyre
2 tread
4 tread shoulder
5 tread edge
6 tread edge
14 central circumferential groove
16 lateral circumferential groove
17 center tread row
18 middle tread row
19 shoulder tread row
20a, b shoulder blocks
22a, b middle blocks
24a, b center blocks
26 inner surface
29 3D sipe
30 wavy groove
31 step
32 multiple step area
33 ground contacting surface
34 axial groove
35 transverse groove
36 transverse groove
37 recess
38 protrusion
39 shoulder edge recess
40 longitudinal block side wall
42 leading block side wall
44 trailing block side wall
46 block edge
48 tie bar
49 side wall edge
50 base of wavy groove
52 tip of wavy groove

The invention claimed is:

1. A pneumatic tyre, the tyre having a circumferential direction, an axial direction and an equatorial plane, and the tyre comprising:
    a tread extending in a tyre circumferential direction, said tread comprising
    at least one circumferential groove running continuously in the circumferential direction, and a plurality of axial grooves or transverse grooves running at an angle to the axial direction, and
    a plurality of blocks defined by the circumferential groove and the axial grooves or transverse grooves,
    said blocks extending radially between an inner surface of the tread and a tread surface to come into contact with a ground,
    wherein at least some of the blocks comprise at least one wavy groove that extends from a circumferential groove inwardly into the block, and wherein the wavy groove has a depth extending radially from the tread surface to come into contact with the ground towards the inner surface that ends above the inner surface of the tread,
    wherein at least a portion of one or more longitudinal side walls of blocks of a middle tread row comprises a step, wherein the wavy groove is arranged on said portion of the longitudinal side wall comprising the step and has a depth at the longitudinal side wall extending in the radial direction from the tread surface to the step, and wherein the step has a height extending in a radial direction from the inner surface of the tread to a bottom of the groove at the longitudinal side wall, and
    wherein the depth of the wavy groove decreases along its length inwardly into the block.

2. The tyre according to claim 1, wherein the tread comprises on each side of the equatorial plane a central circumferential groove running continuously in a zigzag manner in the circumferential direction, and a lateral circumferential groove running continuously in a zigzag manner in the circumferential direction, wherein the lateral circumferential groove is arranged outwardly of the central circumferential groove in the tyre axial direction; and a center tread row delimited by the central circumferential grooves, a middle tread row arranged on each lateral side of the center tread row and delimited by the central circumferential groove and the lateral circumferential groove, and a shoulder tread row arranged on the lateral side of the of the middle tread row in the tyre axial direction;

each of the tread rows comprising a plurality of blocks, said blocks in each tread row being separated from each other by axial grooves or transverse grooves running at an angle to the axial direction;

wherein the blocks of the middle tread row comprise a wavy groove, and wherein the wavy grooves alternatingly extend from the central circumferential groove or the lateral circumferential groove inwardly into the blocks.

3. The tyre according to claim 1, wherein center blocks of a center tread row comprise at least one multi-step area on a longitudinal block side wall, the multi-step area protruding into the central circumferential grooves and comprising at least two or three steps above the inner surface.

4. The tyre according to claim 1, wherein center blocks of a center tread row, middle blocks of a middle tread row and shoulder blocks of a shoulder tread row comprise a plurality of zigzag shaped 3D sipes, wherein the sipe density in the middle tread row is configured to be larger than the sipe density in the shoulder tread row.

5. The tyre according to claim 1, wherein a sipe density in a middle tread row of the tyre is configured to be larger than a sipe density in a center tread row of the tyre.

6. The tyre according to claim 1, wherein center blocks of a center tread row are arranged in pairs of adjacent tread blocks, wherein each pair of center blocks in longitudinal direction is separated from the following pair by an axial groove and each single center block is separated from the other block of the pair by a transverse groove, wherein the transverse groove has a segmented Z-shaped form.

7. The tyre according to claim 1, wherein middle blocks of a middle tread row are arranged in pairs of adjacent tread blocks, wherein each pair of middle blocks in longitudinal direction is separated from the following pair by a transverse groove and each single middle block is separated from the other block of the pair by a transverse groove, wherein the transverse groove has a segmented Z-shaped form.

8. The tyre according to claim 1, wherein at least some blocks of a shoulder tread row of the tyre comprises a recess along the tread edge, wherein the recess has a length $l_r$ extending longitudinally from the block edge ranging from 30% to 70%, relative to the longitudinal length $l_b$ of the block.

9. The tyre according to claim 1, wherein at least some blocks of a shoulder tread row of the tyre comprise a recess on a tread shoulder of the tyre, the recess extending inwardly from the surface of the tread shoulder.

10. The tyre according to claim 1, wherein at least some blocks of a shoulder row of the tyre comprise a protrusion on a tread shoulder of the tyre, the protrusion extending outwardly from the surface of the tread shoulder.

11. The tyre according to claim 1, wherein at least some blocks of a shoulder row of the tyre comprises a recess along a tread edge, wherein the recess has a length $l_r$ extending longitudinally from a block edge ranging from 40% to 60%, relative to the longitudinal length $l_b$ of the block.

12. The tyre according to claim 1, wherein said portion of the longitudinal side wall at which the wavy groove is arranged has a single step.

13. The tyre according to claim 1, wherein the wavy grooves extend at an angle of from 10° to 50° to the axial direction.

* * * * *